United States Patent
Onishi et al.

(10) Patent No.: US 12,023,553 B2
(45) Date of Patent: Jul. 2, 2024

(54) GOLF BALL

(71) Applicant: Sumitomo Rubber Industries, Ltd., Kobe (JP)

(72) Inventors: Masayuki Onishi, Kobe (JP); Yasuo Naito, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 4 days.

(21) Appl. No.: 17/733,528

(22) Filed: Apr. 29, 2022

(65) Prior Publication Data

US 2022/0355164 A1 Nov. 10, 2022

(30) Foreign Application Priority Data

Apr. 30, 2021 (JP) ................... 2021-078020

(51) Int. Cl.
| | |
|---|---|
| *A63B 37/06* | (2006.01) |
| *A63B 37/00* | (2006.01) |
| *C09D 129/02* | (2006.01) |
| *C09D 175/04* | (2006.01) |

(52) U.S. Cl.
CPC .. *A63B 37/00222* (2020.08); *A63B 37/00221* (2020.08); *C09D 129/02* (2013.01); *C09D 175/04* (2013.01)

(58) Field of Classification Search
CPC .......................... A63B 37/0022; A63B 37/0023
See application file for complete search history.

(56) References Cited

U.S. PATENT DOCUMENTS

| | | | |
|---|---|---|---|
| 2011/0053708 A1 | 3/2011 | Isoagawa et al. | |
| 2011/0244989 A1* | 10/2011 | Tarao | C08G 18/00 473/378 |
| 2016/0184650 A1* | 6/2016 | Tachibana | B29D 99/0042 473/376 |
| 2017/0340922 A1* | 11/2017 | Inoue | C08G 18/792 |
| 2020/0139199 A1 | 5/2020 | Horiuchi et al. | |

FOREIGN PATENT DOCUMENTS

| | | |
|---|---|---|
| JP | 2011-67595 A | 4/2011 |
| JP | 2011-217820 A | 11/2011 |
| JP | 2014-14383 A | 1/2014 |
| JP | 2017-209298 A | 11/2017 |
| JP | 2020-69309 A | 5/2020 |
| JP | 2020-99669 A | 7/2020 |

* cited by examiner

*Primary Examiner* — Raeann Gorden
(74) *Attorney, Agent, or Firm* — Birch, Stewart, Kolasch & Birch, LLP

(57) ABSTRACT

An object of the present disclosure is to provide a novel golf ball having excellent spin performance on approach shots. The present disclosure provides a golf ball comprising a paint film, wherein a base resin constituting an outermost layer of the paint film is a polyurethane obtained by a reaction between (A) a polyol composition containing a polyol having a side chain and (B) a polyisocyanate composition, a loss modulus (E") at a temperature of −50° C. is $2.0 \times 10^8$ Pa or more, and a loss tangent (tan δ) has a peak with a peak height of 0.1 or more and 0.5 or less in a temperature range of −60° C. or more and −20° C. or less, wherein the loss modulus (E") and the loss tangent (tan δ) are obtained by measuring a dynamic viscoelasticity of the polyurethane under specific conditions.

13 Claims, 1 Drawing Sheet

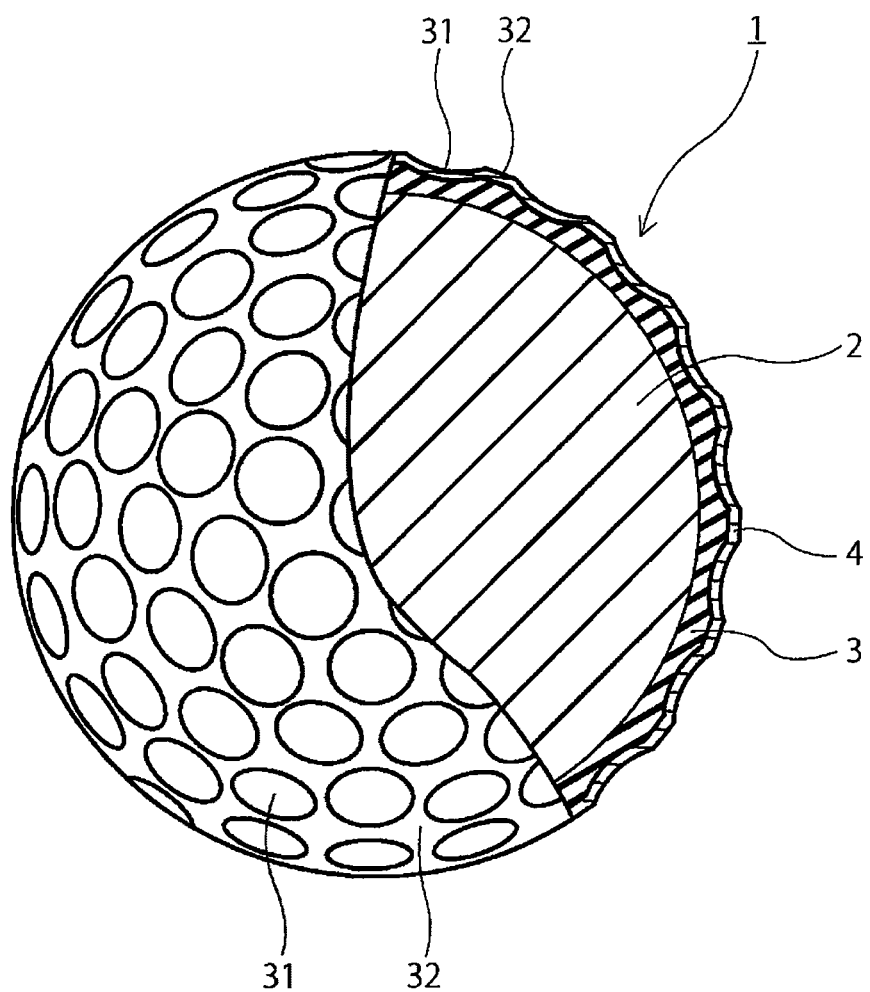

GOLF BALL

FIELD OF THE INVENTION

The present disclosure relates to a golf ball having a paint film.

DESCRIPTION OF THE RELATED ART

A paint film is formed on a surface of a golf ball body. It has been proposed to improve properties of the golf ball by improving the paint film.

JP 2011-67595 A discloses a golf ball comprising a core, a cover disposed on an external side of the core, and a paint layer disposed on an external side of the cover, wherein the cover has a Shore D hardness of 61 or less, and the paint layer has a Martens hardness of 2.0 mgf/μm² or less.

JP 2011-217820 A discloses a golf ball comprising a golf ball body and a paint film formed on a surface of the golf ball body, wherein the paint film has a Martens hardness of 2.0 mgf/μm² or less, and a ratio (50% elastic modulus/10% elastic modulus) of 50% elastic modulus to 10% elastic modulus of 1.6 or more.

JP 2014-14383 A discloses a golf ball comprising a golf ball body and a paint film formed on a surface of the golf ball body, wherein the paint film has a storage modulus (E') of $1.00 \times 10^7$ dyn/cm² or more and $1.00 \times 10^8$ dyn/cm² or less in a temperature range of from 120° C. to 150° C., and a loss tangent (tan δ) of 0.050 or more at a temperature of 10° C., measured with a dynamic viscoelasticity measuring apparatus under specific measuring conditions.

JP 2017-209298 A discloses a golf ball comprising a golf ball body and a paint film covering the golf ball body, wherein a loss tangent tan δ obtained by measuring a dynamic viscoelasticity of the paint film has a peak temperature of 50° C. or less, and a peak height of less than 0.8.

JP 2020-69309 A discloses a golf ball comprising a golf ball body and a paint film composed of at least one layer and formed on a surface of the golf ball body, wherein an outermost layer of the paint film located at the outermost layer of the golf ball contains, as a base resin, a polyurethane obtained by a reaction between (A) a polyisocyanate composition and (B) a polyol composition, (B) the polyol composition contains a urethane polyol as a polyol component, and a loss tangent (tan δ) of the outermost layer of the paint film measured with a dynamic viscoelasticity measuring apparatus under specific measuring conditions has a peak temperature in a range of from −40° C. to 40° C.

JP 2020-99669 A discloses a golf ball comprising a golf ball body and a paint film composed of at least one layer and formed on a surface of the golf ball body, wherein a base resin constituting an outermost layer of the paint film is a polyurethane obtained by a reaction between (A) a polyol composition and (B) a polyisocyanate composition, and a loss modulus (E") at a temperature of −50° C. obtained by measuring a dynamic viscoelasticity of the polyurethane under specific conditions is $1.00 \times 10^8$ Pa or more.

SUMMARY OF THE INVENTION

Approach shots include an approach shot hitting a golf ball from a location such as green edge and fairway where grass has been cut under a condition that no water exists between the golf ball and the club face of the wedge (dry condition). It is easy to impart spin to the golf ball on the approach shot under the dry condition, thereby easily controlling the golf ball. Approach shots further include an approach shot hitting a golf ball from the rough where grass around the green is not cut. It is hard to impart the desired spin to the golf ball on the approach shot from the rough, since the grass exists between the golf ball and the club face of the wedge. Thus, there exists a problem that the controllability on approach shots from the rough tends to be lowered.

The present disclosure has been made in view of the abovementioned circumstances, and an object of the present disclosure is to provide a novel golf ball having excellent spin performance on approach shots from the rough while having maintained spin performance on approach shots under a dry condition.

The present disclosure provides a golf ball comprising a golf ball body and a paint film composed of at least one layer and formed on a surface of the golf ball body, wherein a base resin constituting an outermost layer of the paint film includes a polyurethane obtained by a reaction between (A) a polyol composition containing a polyol having a side chain and (B) a polyisocyanate composition, a loss modulus (E") at a temperature of −50° C. is $2.0 \times 10^8$ Pa or more, and a loss tangent (tan δ) has a peak with a peak height of 0.1 or more and 0.5 or less in a temperature range of −60° C. or more and −20° C. or less, wherein the loss modulus (E") and the loss tangent (tan δ) are obtained by measuring a dynamic viscoelasticity of the polyurethane under the following conditions:

<measuring conditions>
measuring mode: sine wave tensile mode
measuring temperature range: −100° C. to 100° C.
temperature increasing rate: 3° C./min
oscillation frequency: 10 Hz
measuring strain: 0.05%.

When the hitting speed on approach shots is 16 m/s, and the convex-concave of the face land portion of the wedge has a width of several micrometers, the vibration the paint film of the golf ball receives on approach shots is $10^7$ Hz. According to the time-temperature conversion rule, the dynamic viscoelasticity of the paint film measured at normal temperature and the vibration of $10^7$ Hz is converted to the dynamic viscoelasticity measured at the temperature of −50° C. and a frequency of 10 Hz. The inventors of the present disclosure have found that controlling the loss modulus, and the peak temperature and peak height of the loss tangent (tan δ) measured at the temperature of −50° C. and the frequency of 10 Hz improves the spin performance on approach shots, and thus has accomplished the present disclosure.

According to the present disclosure, a golf ball having excellent spin performance on approach shots is obtained.

BRIEF DESCRIPTION OF THE DRAWINGS

The FIGURE is a partially cutaway cross-sectional view of a golf ball according to one embodiment of the present disclosure.

DESCRIPTION OF THE PREFERRED EMBODIMENT

The present disclosure provides a golf ball comprising a golf ball body and a paint film composed of at least one layer and formed on a surface of the golf ball body, wherein a base resin constituting an outermost layer of the paint film is a polyurethane obtained by a reaction between (A) a polyol composition containing a polyol having a side chain and (B) a polyisocyanate composition, a loss modulus (E") at a temperature of −50° C. is $2.0 \times 10^8$ Pa or more, and a loss tangent (tan δ) has a peak with a peak height of 0.1 or more and 0.5 or less in a temperature range of −60° C. or more and −20° C. or less, wherein the loss modulus (E") and the loss tangent (tan δ) are obtained by measuring a dynamic viscoelasticity of the polyurethane under the following conditions:
<measuring conditions>
measuring mode: sine wave tensile mode
measuring temperature range: −100° C. to 100° C.
temperature increasing rate: 3° C./min
oscillation frequency: 10 Hz
measuring strain: 0.05%.

The loss modulus (E") at the temperature of −50° C., obtained by measuring the dynamic viscoelasticity of the polyurethane constituting the outermost layer of the paint film of the golf ball according to the present disclosure under the above conditions, is $2.0 \times 10^8$ Pa or more. From the viewpoint of enhancing the spin performance on approach shots, the loss modulus (E") is preferably $2.2 \times 10^8$ Pa or more, more preferably $2.3 \times 10^8$ Pa or more, and is preferably $1.0 \times 10^9$ Pa or less, more preferably $8.0 \times 10^8$ Pa or less, and even more preferably $6.0 \times 10^8$ Pa or less.

The loss tangent (tan δ), obtained by measuring the dynamic viscoelasticity of the polyurethane constituting the outermost layer of the paint film of the golf ball according to the present disclosure under the above conditions, has a peak in the temperature range below 0° C. The loss tangent (tan δ) preferably further has a peak in a temperature range above 0° C. It is noted that the peak in the temperature range below 0° C. is referred to as the first peak and the peak in the temperature range above 0° C. is referred to as the second peak in the following description.

The loss tangent (tan δ) has the first peak in the temperature range of −60° C. or more and −20° C. or less. The peak temperature of the first peak of the loss tangent (tan δ) is preferably −60° C. or more, more preferably −58° C. or more, and even more preferably −55° C. or more, and is preferably −20° C. or less, more preferably −25° C. or less, and even more preferably −30° C. or less. If the peak temperature of the first peak of the loss tangent (tan δ) falls within the above range, the spin performance on approach shots is better.

The peak height of the first peak of the loss tangent (tan δ) is preferably 0.1 or more, more preferably 0.12 or more, and even more preferably 0.15 or more, and is preferably 0.5 or less, more preferably 0.45 or less, and even more preferably 0.4 or less. If the peak height of the first peak of the loss tangent (tan δ) falls within the above range, the energy transfer efficiency is better, thus the shear force is greater and the spin performance is better.

The storage modulus (E') at the temperature of 0° C., obtained by measuring the dynamic viscoelasticity of the polyurethane constituting the outermost layer of the paint film of the golf ball according to the present disclosure under the above conditions, is preferably $0.5 \times 10^8$ Pa or more and $1.5 \times 10^9$ Pa or less.

The contacting time of the golf ball with the face of the wedge on approach shots is about 500 microseconds, which means the paint film bites into the score line of the wedge about 2000 times per second (=2000 Hz). According to the time-temperature conversion rule, the dynamic viscoelasticity of the paint film measured at normal temperature and the vibration of 2000 Hz is converted to the dynamic viscoelasticity measured at a temperature of 0° C. and a frequency of 10 Hz. Thus, the inventors of the present disclosure have focused on the storage modulus (E') measured at the temperature of 0° C. and the frequency of 10 Hz. If the polyurethane having the storage modulus (E') falling within the above range is used, biting of the paint film into the score line of the wedge is greater. As a result, the spin performance is better.

From the viewpoint of enhancing the spin performance on approach shots, the storage modulus (E') is more preferably $1.0 \times 10^8$ Pa or more, and even more preferably $2.0 \times 10^8$ Pa or more, and is more preferably $1.3 \times 10^9$ Pa or less, and even more preferably $9.0 \times 10^8$ Pa or less.

In a preferable embodiment of the present disclosure, the 10% elastic modulus of the paint film covering the golf ball body is 130 kgf/cm$^2$ (12.7 MPa) or less, more preferably 120 kgf/cm$^2$ (11.8 MPa) or less, and eve more preferably 110 kgf/cm$^2$ (10.8 MPa) or less. If the 10% elastic modulus of the paint film is 130 kgf/cm$^2$ (12.7 MPa) or less, the paint film is soft, and thus the spin rate on approach shots increases.

The lower limit of the 10% elastic modulus of the paint film is not particularly limited to, but is preferably 2 kgf/cm$^2$ (0.2 MPa), more preferably 4 kgf/cm$^2$ (0.4 MPa), and even more preferably 6 kgf/cm$^2$ (0.6 MPa). This is because if the 10% elastic modulus is excessively low, the paint film is so soft that a tackiness feeling remains, and the feeling is poor.

The base resin constituting the outermost layer of the paint film of the golf ball according to the present disclosure includes a polyurethane obtained by a reaction between (A) a polyol composition containing a polyol having a side chain and (B) a polyisocyanate composition. The polyurethane is preferably a polymer having a plurality of urethane bonds in the main chain. Firstly, the polyol composition and the polyisocyanate composition will be explained.

The polyol composition contains a polyol having at least two hydroxy groups. Examples of the polyol include a low molecular weight polyol having a molecular weight of less than 500, and a high molecular weight polyol having an average molecular weight of 500 or more. Examples of the low molecular weight polyol include a diol such as ethylene glycol, diethylene glycol, triethylene glycol, 1,3-butanediol, 1,4-butanediol, neopentyl glycol and 1,6-hexanediol; and a triol such as glycerine, trimethylolpropane and hexane triol. Examples of the high molecular weight polyol include a polyether polyol such as polyoxyethylene glycol (PEG), polyoxypropylene glycol (PPG) and polyoxytetramethylene glycol (PTMG); a condensed polyester polyol such as polyethylene adipate (PEA), polybutylene adipate (PBA) and polyhexamethylene adipate (PHMA); a lactone polyester polyol such as poly-ε-caprolactone (PCL); a polycarbonate polyol such as polyhexamethylene carbonate; a urethane polyol; and an acrylic polyol. The polyol may be used solely or as a mixture of at least two of them.

(A) The polyol composition used in the present disclosure contains a polyol having a side chain as a polyol component. Examples of the polyol having the side chain include a high molecular weight polyol having a side chain, and a low molecular weight polyol having a side chain.

The side chain of the polyol having the side chain is preferably a hydrocarbon group having 1 to 7 carbon atoms, more preferably a hydrocarbon group having 1 to 5 carbon atoms, and even more preferably a hydrocarbon group having 1 to 3 carbon atoms. Examples of the hydrocarbon group include an alkyl group, an alkenyl group, and an alkynyl group, and the alkyl group is more preferable. If the number of carbon atoms of the side chain falls within the above range, orientation of the molecular chain is inhibited by the steric hindrance of the side chain, thus the paint film becomes softer and the spin performance becomes better.

The number average molecular weight of the high molecular weight polyol having the side chain is not particularly limited to, but is preferably 1000 or more, more preferably 1200 or more, and even more preferably 1500 or more, and is preferably 3000 or less, more preferably 2800 or less, and even more preferably 2500 or less.

Examples of the high molecular weight polyol having the side chain include a polyether polyol having a side chain, and a polyester polyol having a side chain, and the polyether polyol having the side chain is preferable. The high molecular weight polyol having the side chain is preferably a high molecular weight diol having a side chain.

Examples of the polyether polyol having the side chain include a polyoxypropylene glycol (PPG), and a polyoxyethylene glycol (PEG)-polyoxypropylene glycol (PPG) block copolymer.

The polyester polyol having the side chain is preferably a polyester diol obtained by a reaction between a dicarboxylic acid and a diol, wherein at least either of the dicarboxylic acid and the diol has a side chain.

The diol having the side chain is preferably an alkylene diol having a side chain. The alkylene diol having the side chain is preferably an alkylene diol having 3 to 18 carbon atoms, more preferably an alkylene diol having 3 to 10 carbon atoms.

Specific examples of the alkylene diol having the side chain include 1,2-propanediol (propylene glycol), 1,3-butanediol, 2-methyl-1,3-propanediol, neopentyl glycol (2,2-dimethyl-1,3-propanediol), 1,4-pentanediol, 3-methyl-1,5-pentanediol, 2,5-hexanediol, 2-methyl-1,4-pentanediol, 2,2,4-trimethyl-1,3-pentanediol, 2,4-diethyl-1,5-pentanediol, 2-butyl-2-ethyl-1,3-propanediol, 2-methyl-1,8-octanediol, and 2,2,4-trimethyl-1,6-hexanediol.

The dicarboxylic acid having the side chain is preferably an alkylene dicarboxylic acid having a side chain. The alkylene dicarboxylic acid having side chain is preferably an alkylene dicarboxylic acid having 3 to 18 carbon atoms, more preferably an alkylene dicarboxylic acid having 3 to 10 carbon atoms.

Specific examples of the alkylene dicarboxylic acid having the side chain include 2-methylmalonic acid, 2,2-dimethylmalonic acid, 2-methylsuccinic acid, 2,2,3,3-tetramethylsuccinic acid, 2-methylglutaric acid, 3-methylglutaric acid, 3,3-dimethylglutaric acid, 2,4-dimethylglutaric acid, 2,2,3-trimethylglutaric acid, 2,2,4-trimethylglutaric acid, 2,3,3-trimethylglutaric acid, and 2,3,4-trimethylglutaric acid. In addition to these alkylene dicarboxylic acids, specific examples of the alkylene dicarboxylic acid having the side chain further include alkylene dicarboxylic acids obtained by oxidizing the above-described alkylene diol having the side chain.

The polyol having the side chain used in the present disclosure excludes trimethylolpropane.

(A) The polyol composition used in the present disclosure preferably contains a urethane polyol. The amount of the urethane polyol in the polyol of (A) the polyol composition is preferably 60 mass % or more, more preferably 70 mass % or more, and even more preferably 80 mass % or more. It is also preferable that the polyol of (A) the polyol composition consists of the urethane polyol.

The urethane polyol is a compound having a plurality of urethane bonds in the molecule and having at least two hydroxyl groups in one molecule. Examples of the urethane polyol include a urethane prepolymer obtained by a reaction between a polyol and a polyisocyanate under a condition that the amount of hydroxyl groups in the polyol is excessive to the amount of isocyanate groups in the polyisocyanate.

In the present disclosure, the polyol component for constituting the urethane polyol preferably includes the high molecular weight polyol having the side chain, more preferably includes the polyoxypropylene glycol.

The number average molecular weight of the high molecular weight polyol for constituting the urethane polyol is preferably 1000 or more, more preferably 1200 or more, and even more preferably 1500 or more, and is preferably 3000 or less, more preferably 2800 or less, and even more preferably 2500 or less. If the number average molecular weight of the high molecular weight polyol is 1000 or more, the distance between crosslinking points in the paint film becomes long and the paint film becomes soft, thus the spin performance is enhanced. If the number average molecular weight of the high molecular weight polyol is 3000 or less, the distance between crosslinking points in the paint film does not become excessively long, and thus the stain resistance of the paint film becomes better. It is noted that the number average molecular weight of the high molecular weight polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

Examples of the polyol component of the urethane polyol include a low molecular weight polyol component having a molecular weight of less than 500, and a high molecular weight polyol component having an average molecular weight of 500 or more, in addition to the polyol having the side chain component. Examples of the low molecular weight polyol component include a diol such as ethylene glycol, diethylene glycol, triethylene glycol, 1,4-butanediol and 1,6-hexanediol; and a triol such as glycerine, trimethylolpropane and hexane triol. Examples of the high molecular weight polyol component include a linear polyether diol, and a linear polyester diol. The polyol component may be used solely or as a mixture of at least two of them.

The urethane polyol preferably includes the triol component and the high molecular weight diol component having the side chain, as the polyol component. The triol component is preferably trimethylolpropane. The high molecular weight diol component having the side chain is preferably the polyoxypropylene glycol (diol type). A mixing ratio (triol component/high molecular weight diol component having the side chain) of the triol component to the high molecular weight diol component having the side chain is preferably 1.0 or more, more preferably 1.1 or more, and even more preferably 1.2 or more, and is preferably 2.6 or less, more preferably 2.5 or less, and even more preferably 2.4 or less, in a molar ratio of OH group.

The polyisocyanate component for constituting the urethane polyol is not particularly limited, as long as the polyisocyanate component has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These polyisocyanates may be used solely or as a mixture of at least two of them.

The amount of the polyoxypropylene glycol having the number average molecular weight of from 1000 to 3000 in the urethane polyol is preferably 55 mass % or more, more preferably 60 mass % or more, and even more preferably 63 mass % or more, and is preferably 90 mass % or less, more preferably 85 mass % or less, and even more preferably 80 mass % or less. The polyoxypropylene glycol having the number average molecular weight of from 1000 to 3000 forms a soft segment in the paint film. Thus, if the amount of the polyoxypropylene glycol is 55 mass % or more, the obtained golf ball has further enhanced spin performance.

The number average molecular weight of the urethane polyol is preferably 5000 or more, more preferably 5300 or more, and even more preferably 5500 or more, and is preferably 20000 or less, more preferably 19800 or less, and even more preferably 19600 or less. If the number average molecular weight of the urethane polyol is 5000 or more, the distance between crosslinking points in the paint film becomes long and the paint film becomes soft, thus the spin performance is enhanced. If the number average molecular weight of the urethane polyol is 20000 or less, the distance between crosslinking points in the paint film does not become excessively long, and thus the stain resistance of the paint film becomes better.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less.

The hydroxyl value of the polyol contained in the polyol composition is preferably 10 mgKOH/g or more, more preferably 15 mgKOH/g or more, and even more preferably 20 mgKOH/g or more, and is preferably 400 mgKOH/g or less, more preferably 300 mgKOH/g or less, even more preferably 200 mgKOH/g or less, particularly preferably 170 mgKOH/g or less, and most preferably 160 mgKOH/g or less. If the hydroxyl value of the polyol component falls with the above range, adhesion of the paint film to the golf ball body is enhanced. It is noted that in the present disclosure, the hydroxyl value can be measured according to JIS K 1557-1, for example, by an acetylation method.

Next, the polyisocyanate composition will be explained. The polyisocyanate composition contains one polyisocyanate or at least two polyisocyanates. Examples of the polyisocyanate include a compound having at least two isocyanate groups.

Examples of the polyisocyanate include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); an alicyclic diisocyanate or aliphatic diisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and a triisocyanate such as an allophanate-modified product, biuret-modified product, isocyanurate-modified product and adduct-modified product of the above-described diisocyanates.

The allophanate-modified product is, for example, a triisocyanate obtained by further reacting a diisocyanate with a urethane bond formed by a reaction between a diisocyanate and a low molecular weight diol. The adduct-modified product is a triisocyanate obtained by a reaction between a diisocyanate and a low molecular weight triol such as trimethylolpropane and glycerine. The biuret-modified product is, for example, a triisocyanate having a biuret bond, represented by the following formula (1). The isocyanurate-modified product of the diisocyanate is, for example, a triisocyanate represented by the following formula (2).

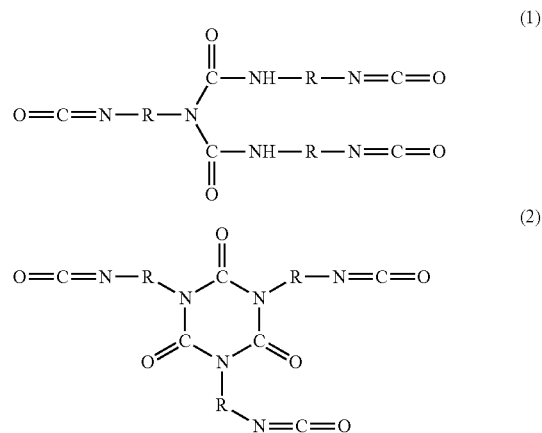

[In the formulae (1) and (2), R represents a residue where isocyanate groups are removed from the diisocyanate.]

The polyisocyanate composition preferably contains the triisocyanate. The amount of the triisocyanate in the polyisocyanate of the polyisocyanate composition is preferably 50 mass % or more, more preferably 60 mass % or more, and even more preferably 70 mass % or more. It is also preferable that the polyisocyanate of the polyisocyanate composition consists of the triisocyanate.

(B) The polyisocyanate composition used in the present disclosure preferably contains an isocyanurate-modified product of diisocyanate as the polyisocyanate component, more preferably contains an isocyanurate-modified product of hexamethylene diisocyanate and/or an isocyanurate-modified product of isophorone diisocyanate as the polyisocyanate component. This is because the loss modulus of the obtained polyurethane at the temperature of −50° C. is greater.

The amount (NCO %) of the isocyanate group in the polyisocyanate of the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount (NCO %) of the isocyanate group of the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur N75MPA/X, Desmodur L75 (C), Desmodur Z4470BA, Sumidur N3300, and Sumidur E21-1 available from Sumika Covestro Urethane Co., Ltd.; Coronate HX, and Coronate HK available from Nippon Polyurethane Industry Co., Ltd.; Duranate 24A-100, Duranate 21S-75E, Duranate TPA-100, and Duranate TKA-100 available from Asahi Kasei Chemicals Corporation; and VESTANAT T1890 available from Degussa Co., Ltd.

The base resin constituting the outermost layer of the paint film of the golf ball according to the present disclosure contains the polyurethane obtained by the reaction between the polyol composition and the polyisocyanate composition. In the reaction between the polyol composition and the polyisocyanate composition, the molar ratio (NCO group/OH group) of the isocyanate group (NCO group) included in the polyisocyanate composition to the hydroxyl group (OH group) included in the polyol composition is preferably 0.5 or more, more preferably 0.7 or more, and even more preferably 0.9 or more. If the molar ratio (NCO group/OH group) is 0.5 or more, the crosslinking density is greater, and thus the obtained paint film has better stain resistance. In addition, if the molar ratio (NCO group/OH group) is excessively great, the amount of the isocyanate group is excessive, and the obtained paint film does not only become hard and fragile but also has deteriorated appearance. Thus, the molar ratio (NCO group/OH group) is preferably 3.5 or less, more preferably 3.0 or less, and even more preferably 2.5 or less. It is noted that the reason why the appearance of the obtained paint film deteriorates if the amount of the isocyanate group in the paint becomes excessive is that an excessive amount of the isocyanate group may promote a reaction between the moisture in air and the isocyanate group, thereby generating a lot of carbon dioxide gas.

The paint film of the golf ball according to the present disclosure is preferably formed from a paint containing the polyol composition and the polyisocyanate composition. Examples of the paint include a so-called two-component curing type paint having a first agent containing the polyol composition, and a second agent containing the polyisocyanate composition. The paint may be either a waterborne paint mainly containing water as a dispersion medium or a solvent-based paint containing an organic solvent as a dispersion medium. In the case of the solvent-based paint, examples of the preferable solvent include toluene, isopropyl alcohol, xylene, methylethyl ketone, methylisobutyl ketone, ethylene glycol monomethyl ether, ethylbenzene, propylene glycol monomethyl ether, isobutyl alcohol, ethyl acetate, and butyl acetate.

In the two-component curing type paint, the total solid amount of the first agent and the second agent is preferably 24 mass % or more, more preferably 26 mass % or more, and even more preferably 28 mass % or more, and is preferably 45 mass % or less, more preferably 44 mass % or less, and even more preferably 43 mass % or less. If the solid amount is 24 mass % or more, it is easy to uniformly apply the paint, thus the paint film has a more uniform thickness, and if the solid amount is 45 mass % or less, the paint has a better leveling property and the convex-concave of the paint film surface is decreased, thus the golf ball has a better appearance.

The paint may further contain additives generally contained in a paint for a golf ball, such as a filler, an ultraviolet absorber, an antioxidant, a light stabilizer, a fluorescent brightener, an anti-blocking agent, a leveling agent, a slip agent, and a viscosity modifier, where necessary.

Next, the method for applying the curing type paint of the present disclosure will be explained. The method for applying the curing type paint is not particularly limited, and a conventional method can be adopted. Examples of the method include a spray coating and electrostatic coating.

In the case of performing the spray coating with an air gun, the polyol composition and the polyisocyanate composition are fed with respective pumps and continuously mixed with a line mixer located in the stream line just before the air gun, and the obtained mixture is air-sprayed. Alternatively, the polyol composition and the polyisocyanate composition are air-sprayed respectively with an air spray system provided with a device for controlling the mixing ratio thereof. The paint application may be conducted by spraying the paint one time or overspraying the paint multiple times.

The curing type paint applied on the golf ball body can be dried, for example, at a temperature in a range of from 30° C. to 70° C. for 1 hour to 24 hours, to form the paint film.

The golf ball according to the present disclosure is not particularly limited, as long as the golf ball comprises a golf ball body and a paint film composed of at least one layer and formed on a surface of the golf ball body, wherein a base resin constituting an outermost layer of the paint film includes the polyurethane obtained by the reaction between (A) the polyol composition containing the polyol having the side chain and (B) the polyisocyanate composition.

In the case that the paint film is single layered, the base resin of the single layered paint film includes the polyurethane obtained by the reaction between (A) the polyol composition containing the polyol having the side chain and (B) the polyisocyanate composition.

In the case that the paint film has a multiple layered structure composed of at least two layers, the base resin constituting the outermost layer of the paint film includes the polyurethane obtained by the reaction between (A) the polyol composition containing the polyol having the side chain and (B) the polyisocyanate composition. Examples of the base resin constituting a layer of the paint film other than the outermost layer of the paint film include, but are not particularly limited to, a polyurethane, an epoxy resin, and an acrylic resin.

In a more preferable embodiment of the present disclosure, the golf ball comprises a golf ball body and a paint film composed of two layers and formed on a surface of the golf ball body, wherein a base resin constituting an outer layer of the paint film is the polyurethane obtained by the reaction between (A) the polyol composition containing the polyol having the side chain and (B) the polyisocyanate composition.

The thickness of the paint film of the golf ball according to the present disclosure is not particularly limited, but the thickness of the paint film is preferably 5 µm or more, more preferably 7 µm or more, and even more preferably 9 µm or more. If the thickness of the paint film is less than 5 µm, the paint film is easy to wear off due to the continued use of the golf ball. In addition, since the spin rate on approach shots increases if the thickness of the paint film is thickened, the thickness of the paint film is preferably 50 µm or less, more preferably 45 µm or less, and even more preferably 40 µm or less. If the thickness of the paint film exceeds 50 µm, the dimple effect is reduced and thus the flight performance of the golf ball may be lowered. The thickness of the paint film can be measured, for example, by observing the cross section of the golf ball with a microscope (VHX-1000 available from Keyence Corporation). It is noted that when the paint has a multiple layered structure, the total thickness of all the paint film layers preferably falls within the above range.

The golf ball according to the present disclosure is not particularly limited, as long as the golf ball comprises a golf ball body and a paint film composed of at least one layer and formed on a surface of the golf ball body. The construction of the golf ball body is not particularly limited, and the golf ball body may be a one-piece golf ball, a two-piece golf ball, a three-piece golf ball, a four-piece golf ball, a multi-piece golf ball composed of five or more pieces, or a wound golf ball. The present disclosure can be suitably applied to any one of the above golf balls.

The FIGURE is a partially cutaway cross-sectional view of a golf ball according to one embodiment of the present disclosure. The golf ball 1 comprises a spherical core 2, a cover 3 covering the spherical core 2, and a paint film 4 formed on a surface of the cover 3. A plurality of dimples 31 are formed on the surface of the cover 3. Other portions than the dimples 31 on the surface of the cover 3 are lands 32.

The golf ball body preferably has a core and a cover covering the core. The cover is preferably formed from a cover composition containing a resin component. The slab hardness of the cover composition is preferably set in accordance with the desired performance of the golf ball. For example, in case of a so-called distance golf ball which focuses on a flight distance, the slab hardness of the cover composition is preferably 50 or more, more preferably 55 or more in Shore D hardness, and is preferably 80 or less, more preferably 70 or less in Shore D hardness. If the slab hardness of the cover composition is 50 or more, the obtained golf ball has a higher launch angle and a lower spin rate on driver shots and iron shots, and thus travels a greater distance. In addition, if the slab hardness of the cover composition is 80 or less, the obtained golf ball has better durability. Further, in case of a so-called spin golf ball which focuses on controllability, the slab hardness of the cover composition is preferably less than 50 in Shore D hardness, and is preferably 20 or more, more preferably 25 or more in Shore D hardness. If the slab hardness of the cover composition is less than 50 in Shore D hardness, the spin rate on approach shots is greater. In addition, if the slab hardness of the cover composition is 20 or more in Shore D hardness, the abrasion resistance is enhanced.

The cover material constituting the cover is not particularly limited, and examples thereof include various resins such as an ionomer resin, a polyester resin, a urethane resin (e.g. thermoplastic urethane resin or two-component curing type urethane resin), and a polyamide resin; a thermoplastic polyamide elastomer having a trade name of "Pebax (registered trademark) (e.g. "Pebax 2533")" available from Arkema Inc.; a thermoplastic polyester elastomer having a trade name of "Hytrel (registered trademark) (e.g. "Hytrel 3548" and "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "TEFABLOC" or thermoplastic polyester elastomer available from Mitsubishi Chemical Corporation. These cover materials may be used solely, or two or more of these cover materials may be used in combination.

The cover may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer (e.g. bis(2,2,6,6-tetramethyl-4-piperidyl) sebacate), a fluorescent material or a fluorescent brightener, or the like, in addition to the above resin component, as long as they do not impair the performance of the cover.

The method for molding the cover from the cover composition is not particularly limited, and examples thereof include a method of injection molding the cover composition directly onto the core; and a method of molding the cover composition into hollow shells, covering the core with a plurality of the hollow shells and compression molding the core with a plurality of the hollow shells (preferably a method of molding the cover composition into half hollow-shells, covering the core with two of the half hollow-shells and compression molding the core with two of the half hollow-shells). The golf ball body having the cover formed thereon is ejected from the mold, and as necessary, the golf ball body is preferably subjected to surface treatments such as deburring, cleaning, and sandblast. In addition, if desired, a mark may also be formed thereon.

The total number of the dimples formed on the cover is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plan view) of the dimples includes, for example, but is not limited to, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

In the present disclosure, a ratio of the total area of all the dimples to the surface area of a phantom sphere is referred to as an occupation ratio. The phantom sphere is a golf ball (sphere) where no dimple exists. In the golf ball according to the present disclosure, the occupation ratio of the dimple is preferably 60% or more, more preferably 63% or more, and even more preferably 66% or more, and is preferably 90% or less, more preferably 87% or less, and even more preferably 84% or less. If the occupation ratio is excessively high, the paint film contributes little to the friction coefficient. In addition, if the occupation ratio is excessively low, the flight performance is lowered.

It is noted that the area of the dimple is an area of a region surrounded by the contour line of the dimple when the central point of the golf ball is viewed from infinity. In the case of a circular dimple, the area S is calculated by the following mathematical formula.

$$S=(Di/2)^2 \cdot \pi \text{ (Di: diameter of the dimple)}$$

The golf ball preferably has a diameter in a range from 40 mm to 45 mm. In light of satisfying the regulation of US Golf Association (USGA), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying the regulation of USGA, the mass is preferably 45.93 g or less.

Next, the one-piece golf ball body and the core used for a wound golf ball, two-piece golf ball and multi-piece golf ball will be explained.

The core or one-piece golf ball body may be formed from a conventionally known rubber composition (hereinafter sometimes simply referred to as "core rubber composition"). For example, the core or one-piece golf ball body may be formed by heat pressing a rubber composition containing a base rubber, a co-crosslinking agent and a crosslinking initiator.

As the base rubber, particularly preferable is a high cis-polybutadiene having a cis-bond in a proportion of 40 mass % or more, more preferably 70 mass % or more, and even more preferably 90 mass % or more in view of its advantageous resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, a compound belonging to diphenyl disulfides, thiophenols or thionaphthols is preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. The amount of the carboxylic acid and/or the salt thereof is preferably 1 part by mass or more and 40 parts by mass or less with respect to 100 parts by mass of the base rubber.

The core rubber composition may further appropriately contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be appropriately set depending on the rubber formulation. Generally, the heat pressing is preferably carried out at a temperature in a range from 130° C. to 200° C. for 10 to 60 minutes, or carried out in a two-step heating of heating at a temperature in a range from 130° C. to 150° C. for 20 to 40 minutes followed by heating at a temperature in a range from 160° C. to 180° C. for 5 to 15 minutes.

In the case that the golf ball according to the present disclosure is a multi-piece golf ball such as a three-piece golf ball, a four-piece golf ball and a golf ball composed of five or more pieces, examples of the material for forming the intermediate layer formed between the core and the outermost cover layer include a thermoplastic resin such as a polyurethane resin, an ionomer resin, a polyamide resin, and a polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing at least a part of carboxyl groups of a copolymer composed of ethylene and an α,β-unsaturated carboxylic acid with a metal ion; and a product obtained by neutralizing at least a part of carboxyl groups of a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, a pigment, and the like. It is noted that the intermediate layer is sometimes referred to as an inner cover or an outer core, depending on the construction of the golf ball.

EXAMPLES

Next, the present disclosure will be described in detail by way of examples. However, the present disclosure is not limited to the examples described below. Various changes and modifications without departing from the spirit of the present disclosure are included in the scope of the present disclosure.

Evaluation Method (1) Measurement of Dynamic Viscoelasticity

The storage modulus E', loss modulus E" and loss tangent tan δ of the paint film were measured under the following conditions.
Apparatus: Dynamic viscoelasticity measuring apparatus Rheogel-E4000 available from UBM CO., Ltd.
Test sample: A paint obtained by blending the base material and the curing agent was dried and cured at a temperature of 40° C. for 4 hours to prepare a paint film having a thickness ranging from 0.11 mm to 0.14 mm. The paint film was cut to prepare a test piece having a width of 4 mm and a distance between the clamps of 20 mm.
measuring mode: sine wave tensile mode
measuring temperature: −100° C. to 100° C.
temperature increasing rate: 3° C./min
measuring date capturing interval: 3° C.
oscillation frequency: 10 Hz
measuring strain: 0.05%

(2) 10% Elastic Modulus of Paint Film

The tensile properties of the paint film were measured according to JIS K7161 (2014). Specifically, the polyisocyanate composition and the polyol composition were blended to prepare a paint, and the obtained paint was dried and cured at a temperature of 40° C. for 4 hours to prepare a paint film (thickness: 0.05 mm). The paint film was punched into the test piece type II (width of parallel part: 10 mm, gauge length: 50 mm) prescribed in JIS K7127 (1999), to prepare a test piece. The tensile test of the test piece was conducted with a precision universal tester (Autograph (registered trademark) available from Shimadzu Corporation) under testing conditions of a length between grips: 100 mm, a tensile speed: 50 mm/min and a testing temperature: 23° C., and the tensile stress at 10% strain (10% elastic modulus) was recorded.

(3) Dry Spin Rate Sd (rpm) on Approach Shots Under a Dry Condition

A sand wedge (RTX-3 (58°) available from Cleveland Golf Inc.) was installed on a swing machine available from Golf Laboratories, Inc. The golf ball was hit at a head speed of 16 m/s, and the spin rate (rpm) thereof was measured by continuously taking a sequence of photographs of the hit golf ball. The measurement was conducted eight times for each golf ball, and the average value thereof was adopted as the spin rate.

(4) Rough Spin Rate Sr (rpm) on Approach Shots from the Rough

A sand wedge (RTX-3 (58°) available from Cleveland Golf Inc.) was installed on a swing machine available from Golf Laboratories, Inc. The golf ball having two pieces of wild grass attached to the surface was used. The golf ball was hit at a head speed of 16 m/s in a state that there existed the wild grass between the face of the sand wedge and the golf ball, and the spin rate (rpm) thereof was measured by continuously taking a sequence of photographs of the hit golf ball. The wild grass was attached to the golf ball with a Scotch tape such that the wild grass was perpendicular to the groove of the face of the sand wedge when the face and the golf ball contacted. The measurement was conducted eight times for each golf ball, and the average value thereof was adopted as the spin rate.

Production of Golf Ball

1. Production of Center

According to the formulation shown in Table 1, the center rubber composition was kneaded, and heat-pressed at a temperature of 170° C. for 20 minutes in upper and lower molds, each having a hemispherical cavity, to obtain a spherical center having a diameter of 39.7 mm. It is noted that the amount of barium sulfate was adjusted such that the ball had a mass of 45.3 g.

TABLE 1

| Center composition | | |
|---|---|---|
| Formulation (parts by mass) | Polybutadiene | 100 |
| | Zinc acrylate | 35 |
| | Zinc oxide | 5 |
| | Barium sulfate | Appropriate amount |
| | Diphenyl disulfide | 0.5 |
| | Dicumyl peroxide | 0.9 |

Polybutadiene rubber: "BR730 (high-cis polybutadiene)" available from JSR Corporation Zinc acrylate: "ZN-DA90S" available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

Diphenyl disulfide: available from Sumitomo Seika Chemicals Company, Limited.

Dicumyl peroxide: "Percumyl (register trademark) D" available from NOF Corporation 2. Preparation of Intermediate Layer Composition and Cover Composition According to the formulations shown in Tables 2 and 3, the materials were mixed with a twin-screw kneading extruder to prepare the intermediate layer composition and the cover composition in a pellet form. The extruding conditions were a screw diameter of 45 mm, a screw rotational speed of 200 rpm, and a screw L/D=35, and the mixture was heated to 200° C. to 260° C. at the die position of the extruder.

TABLE 2

| Intermediate layer composition | | |
|---|---|---|
| Formulation (parts by mass) | Surlyn 8945 | 55 |
| | Himilan AM7329 | 45 |
| | Titanium dioxide | 4 |

Surlyn (registered trademark) 8945: sodium ion-neutralized ethylene-methacrylic acid copolymer ionomer resin available from Du Pont de Nemours, Inc.

Himilan (registered trademark) AM7329: zinc ion-neutralized ethylene-methacrylic acid copolymer ionomer resin available from Du Pont-Mitsui Polychemicals Co., Ltd.

TABLE 3

| Cover composition | | |
|---|---|---|
| Formulation (parts by mass) | Elastollan XNY82A | 100 |
| | Tinuvin 770 | 0.2 |
| | Titanium dioxide | 4 |
| | Ultramarine blue | 0.04 |
| Hardness (Shore D) | | 29 |

Elastollan (registered trademark) XNY82A: thermoplastic polyurethane elastomer available from BASF Japan Ltd.

Tinuvin (registered trademark) 770: bis(2,2,6,6-tetramethyl-4-piperidyl) sebacate available from BASF Japan Ltd.

3. Production of Spherical Core

The intermediate layer composition obtained above was directly injection molded onto the spherical center to form an intermediate layer covering the center and having a thickness of 1.0 mm, thereby obtaining the spherical core. The upper and lower molds for the molding have a semispherical cavity and a retractable hold pin for holding the spherical center. When molding the intermediate layer, the hold pin was protruded to hold the charged center, and the intermediate layer composition heated to 260° C. was injected in 0.3 second into the mold held under a pressure of 80 tons, and cooled for 30 seconds. The mold was opened and the spherical core was ejected from the mold.

4. Molding of Half Shell

The compression molding of half shells was conducted as follows. The obtained cover composition in the pellet form was charged into each of the depressed part of the lower mold for molding the half shells one by one, and a pressure was applied to mold the half shells. The compression molding was conducted under the following conditions: a molding temperature of 170° C., a molding time of 5 minutes, and a molding pressure of 2.94 MPa.

5. Molding of Cover

The spherical core obtained above was concentrically covered with two of the half shells. The cover having a thickness of 0.5 mm was formed by the compression molding. The compression molding was conducted under the following conditions: a molding temperature of 145° C., a molding time of 2 minutes, and a molding pressure of 9.8 MPa.

6. Preparation of Paint

Preparation of the First Agent (Polyol Composition)

As the polyol component, polyoxytetramethylene glycol (PTMG) or polyoxypropylene glycol (PPG), and trimethylolpropane (TMP) were dissolved in a solvent (toluene/methylethyl ketone=1/2, mass ratio) in an amount of 50 mass %. In the obtained solution, dibutyltin laurate was added as a catalyst in an amount of 0.1 mass % with respect to the solid amount of the polyol component. While keeping the temperature of the obtained polyol solution at a temperature of 80° C., isophorone diisocyanate (IPDI) was added dropwise as the polyisocyanate component to the polyol solution and mixed. After finishing the addition of isophorone diisocyanate (IPDI), stirring was continued until the isocyanate group no longer existed. Then, the reaction liquid was cooled to a normal temperature, and a solvent (toluene/methylethyl ketone=1/2, mass ratio) was added therein, to prepare the urethane polyol (solid amount: 30 mass %). The composition and the like of each urethane polyol are shown in Table 4.

Preparation of Paint

According to the NCO/OH ratio shown in Table 5, the second agent was added in the first agent (urethane polyol) prepared above to prepare the paint.

7. Formation of Paint Film

The surface of the golf ball bodies obtained above was treated with sandblast and marked. The paint was applied with a spray gun, and dried for 24 hours in an oven at a temperature of 40° C. to obtain golf balls having a diameter

TABLE 4

|  |  | Urethane polyol No. | | | | |
| --- | --- | --- | --- | --- | --- | --- |
|  |  | 1 | 2 | 3 | 4 | 5 |
| Component | Polyol component | PPG1 | PPG2 | PPG3 | PPG4 | PTMG |
|  |  | TMP | TMP | TMP | TMP | TMP |
|  | Polyisocyanate component | IPDI | IPDI | IPDI | IPDI | IPDI |
| Number average molecular weight of PPG or PTMG | | 700 | 1000 | 1500 | 2000 | 1000 |
| TMP:PPG or PTMG (molar ratio of OH group) | | 1.87:1.0 | 1.87:1.0 | 1.87:1.0 | 1.87:1.0 | 1.87:1.0 |
| Molar ratio (NCO/OH) of NCO group included in polyisocyanate component to OH group included in polyol component | | 0.6 | 0.6 | 0.6 | 0.6 | 0.6 |
| Amount of PPG or PTMG (mass %) | | 56 | 65 | 73 | 78 | 65 |
| Hydroxyl value of solid (mgKOH/g) | | 103.0 | 83.1 | 62.4 | 50.5 | 83.1 |
| Number average molecular weight | | 8106 | 13200 | 16005 | 19560 | 12354 |

As the polyol, the following materials were used.
PPG1: polyoxypropylene glycol (diol type, number average molecular weight: 700) available from FUJIFILM Wako Chemicals Corporation
PPG2: polyoxypropylene glycol (diol type, number average molecular weight: 1000) available from FUJIFILM Wako Chemicals Corporation
PPG3: polyoxypropylene glycol P2000 (number average molecular weight: 1513) available from Sigma-Aldrich Corporation
PPG4: polyoxypropylene glycol (diol type, number average molecular weight: 2000) available from FUJIFILM Wako Chemicals Corporation
PTMG: polyoxytetramethylene glycol (diol type, number average molecular weight: 1000) available from Mitsubishi Chemical Corporation Preparation of the Second Agent (Polyisocyanate Composition)

Polyisocyanate composition No. 1: The isocyanurate-modified product of hexamethylene diisocyanate (Sumidur N3300 available from Sumika Covestro Urethane Co., Ltd.)

Polyisocyanate composition No. 2: a mixture of the isocyanurate-modified product of hexamethylene diisocyanate (Sumidur N3300 available from Sumika Covestro Urethane Co., Ltd.) and the isocyanurate-modified product of isophorone diisocyanate (Desmodur Z4470 available from Sumika Covestro Urethane Co., Ltd.) in a molar ratio of 1:1

As a solvent, a mixed solvent of methylethyl ketone, n-butyl acetate and toluene was further added in the polyisocyanate compositions No. 1 to 2, to adjust the concentration of the polyisocyanate component to be 60 mass %.

of 42.7 mm and a mass of 45.3 g. The paint film had a thickness of 20 μm. The golf ball body was placed in a rotating member provided with three prongs, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation: twice, spraying air pressure: 0.15 MPa, compressed air tank pressure: 0.10 MPa, painting time per one application: one second, atmosphere temperature: 20° C. to 27° C., and atmosphere humidity: 65% or less. Evaluation results regarding the obtained golf balls are shown in Tables 5 and 6.

TABLE 5

|  |  |  | Golf ball No. | | | | |
| --- | --- | --- | --- | --- | --- | --- | --- |
|  |  |  | 1 | 2 | 3 | 4 | 5 |
| Paint | First agent | Urethane polyol No. | 1 | 2 | 3 | 4 | 5 |
|  |  | Number average molecular weight of PPG or PTMG | 700 | 1000 | 1500 | 2000 | 1000 |
|  |  | Second agent (polyisocyanate composition) No. | 1 | 1 | 2 | 2 | 1 |
|  |  | Second agent/First agent (NCO/OH molar ratio) | 1.0 | 1.4 | 1.0 | 1.8 | 1.2 |
|  |  | Solid amount (mass %) | 28 | 28 | 32 | 34 | 34 |
| Properties of paint film | 10% Elastic modulus (kgf/cm$^2$) | | 21 | 20 | 21 | 19 | 20 |
|  | E' ($10^8$ Pa, 0° C., 10 Hz) | | 9.1 | 3.3 | 3.1 | 3.0 | 3.6 |
|  | E'' ($10^8$ Pa, −50° C., 10 Hz) | | 1.8 | 3.1 | 4.5 | 4.6 | 1.0 |

TABLE 5-continued

|  |  | Golf ball No. | | | | |
|---|---|---|---|---|---|---|
|  |  | 1 | 2 | 3 | 4 | 5 |
|  | Temperature of first peak of tan δ (° C.) | — | −34 | −40 | −40 | — |
|  | Height of first peak of tan δ | — | 0.19 | 0.22 | 0.24 | — |
| Evaluation | Dry spin rate Sd (rpm) | 5128 | 5079 | 5109 | 5086 | 5126 |
| of golf | Rough spin rate Sr (rpm) | 3355 | 3825 | 3887 | 3942 | 3736 |
| ball | Retention rate Sr/Sd (%) | 65 | 75 | 76 | 78 | 73 |

The golf balls No. 2 to No. 4 are golf balls comprising a golf ball body and a paint film composed of at least one layer and formed on a surface of the golf ball body, wherein a base resin constituting an outermost layer of the paint film includes a polyurethane obtained by a reaction between (A) a polyol composition containing a polyol having a side chain and (B) a polyisocyanate composition, a loss modulus (E") at a temperature of −50° C. is $2.0 \times 10^8$ Pa or more, and a loss tangent (tan δ) has a peak with a peak height of 0.1 or more and 0.5 or less in a temperature range of −60° C. or more and −20° C. or less, wherein the loss modulus (E") and the loss tangent (tan δ) are obtained by measuring a dynamic viscoelasticity of the polyurethane. It can be seen that the golf balls No. 2 to 4 have greater spin rate on approach shots from the rough and greater spin retention rate than the golf balls No. 1 and 5.

The present disclosure is suitably used for a painted golf ball.

This application is based on Japanese patent application No. 2021-078020 filed on Apr. 30, 2021, the content of which is hereby incorporated by reference.

The invention claimed is:

1. A golf ball comprising a golf ball body and a paint film composed of at least one layer and formed on a surface of the golf ball body,
wherein a base resin constituting an outermost layer of the paint film includes a polyurethane obtained by a reaction between (A) a polyol composition containing a polyol having a side chain and (B) a polyisocyanate composition,
in the reaction between (A) the polyol composition and (B) the polyisocyanate composition, a molar ratio (NCO groups/OH groups) of the isocyanate groups (NCO groups) included in (B) the polyisocyanate composition to the hydroxyl groups (OH groups) included in (A) the polyol composition ranges from 1.4 to 3.5, and
a loss modulus (E") at a temperature of −50° C. is $2.0 \times 10^8$ Pa or more, and a loss tangent (tanδ) has a peak with a peak height of 0.1 or more and 0.5 or less in a temperature range of −60° C. or more and −20° C. or less, wherein the loss modulus (E") and the loss tangent (tanδ) are obtained by measuring a dynamic viscoelasticity of the polyurethane under the following conditions:
<measuring conditions>
measuring mode: sine wave tensile mode
measuring temperature range: −100° C. to 100° C.
temperature increasing rate: 3° C./min
oscillation frequency: 10 Hz
measuring strain: 0.05%.

2. The golf ball according to claim 1, wherein a storage modulus (E') at a temperature of 0° C. ranges from $0.5 \times 10^8$ Pa to $1.5 \times 10^9$ Pa, wherein the storage modulus (E') is obtained by measuring the dynamic viscoelasticity of the polyurethane under the following conditions:
<measuring conditions>
measuring mode: sine wave tensile mode
measuring temperature range: −100° C. to 100° C.
temperature increasing rate: 3° C./min
oscillation frequency: 10 Hz
measuring strain: 0.05%.

3. The golf ball according to claim 1, wherein (A) the polyol composition contains a polyoxypropylene glycol having a number average molecular weight of from 1000 to 3000 as the polyol having the side chain.

4. The golf ball according to claim 1, wherein (A) the polyol composition contains a urethane polyol, and the urethane polyol includes a polyoxypropylene glycol having a number average molecular weight of from 1000 to 3000 as a constituent component.

5. The golf ball according to claim 1, wherein (B) the polyisocyanate composition contains an isocyanurate-modified product of a diisocyanate as a polyisocyanate component.

6. The golf ball according to claim 5, wherein the diisocyanate includes hexamethylene diisocyanate and/or isophorone diisocyanate.

7. The golf ball according to claim 1, wherein the outermost layer of the paint film has 10% elastic modulus of 130 kgf/cm² or less.

8. The golf ball according to claim 1, wherein (A) the polyol composition contains a urethane polyol, and the urethane polyol includes a triol and a high molecular weight diol having a side chain as a constituent component.

9. The golf ball according to claim 8, wherein a mixing ratio (triol/high molecular weight diol having the side chain) of the triol to the high molecular weight diol having the side chain ranges from 1.0 to 2.6 in a molar ratio of OH group.

10. The golf ball according to claim 9, wherein the triol is trimethylolpropane, and the high molecular weight diol having the side chain is a polyoxypropylene glycol having a number average molecular weight of from 1000 to 3000.

11. The golf ball according to claim 10, wherein an amount of the polyoxypropylene glycol having the number average molecular weight of from 1000 to 3000 in the urethane polyol ranges from 55 mass % to 90 mass %.

12. The golf ball according to claim 11, wherein the urethane polyol has a number average molecular weight of from 5000 to 20000.

13. A golf ball comprising a golf ball body and a paint film composed of at least one layer and formed on a surface of the golf ball body,
wherein a base resin constituting an outermost layer of the paint film includes a polyurethane obtained by a reaction between (A) a polyol composition containing a polyol having a side chain and (B) a polyisocyanate composition, (A) the polyol composition contains a urethane polyol, and the urethane polyol includes a polyoxypropylene glycol having a number average molecular weight of from 1000 to 3000 as a constituent component, an amount of the polyoxypropylene glycol having the number average molecular weight of from 1000 to 3000 in the urethane polyol ranges from 55 mass % to 65 mass %, and a loss modulus (E") at a temperature of −50° C. is $2.0 \times 10^8$ Pa or more, and a loss tangent (tan δ) has a peak with a peak height of 0.1 or more and 0.5 or less in a temperature range of −60° C. or more and −20° C. or less, wherein the loss modulus (E") and the loss tangent (tan δ) are obtained by measuring a dynamic viscoelasticity of the polyurethane under the following conditions:

<measuring conditions>
measuring mode: sine wave tensile mode
measuring temperature range: −100° C. to 100° C.
temperature increasing rate: 3° C./min
oscillation frequency: 10 Hz
measuring strain: 0.05%.

\* \* \* \* \*